UNITED STATES PATENT OFFICE.

LORENZ ACH, OF MANNHEIM, AND ALBERT ROTHMANN, OF HEIDELBERG, GERMANY, ASSIGNORS TO C. F. BOEHRINGER & SOEHNE, A FIRM DOING BUSINESS AT MANNHEIM-WALDHOF, GERMANY.

ART OF MAKING DERIVATIVES OF DINITRO-METHYLNITRAMINO-PHENYL-ARSINIC ACIDS.

1,081,079. Specification of Letters Patent. Patented Dec. 9, 1913.

No Drawing. Application filed March 26, 1912. Serial No. 686,342.

*To all whom it may concern:*

Be it known that we, LORENZ ACH and ALBERT ROTHMANN, citizens of the German Empire, residing at Mannheim and Heidelberg, Germany, respectively, have invented certain new and useful Improvements in the Art of Making Derivatives of Dinitro-Methylnitramino-Phenyl-Arsinic Acids; and we do hereby declare the following to be a full, clear, and exact description of the invention, such as will enable other skilled in the art to which it appertains to make and use the same.

This invention relates to the art of preparing derivatives from dinitro-methylnitramino-phenyl-arsinic acids, and in particular the para-acid, the object being to obtain a compound having valuable pharmacal and therapeutic properties.

In the course of our researches and tests made with dinitro-methylnitramino-phenyl-p-arsinic acid or, otherwise expressed, 3.5-dinitro-4-methylnitramino-benzene-1-arsinic acid, a product discovered by us and fully described in our Letters Patent of the United States, No. 1075279, dated Oct. 7, 1913, which is obtained by reacting with a nitrating mixture on dimethyl-anilin-arsenic oxid in the manner as fully and clearly described in our said Patent No. 1075279, found that the same may be reduced to a dimethyl-amino-tetramino-arseno-benzene by the action of reducing agents such as tin and hydrochloric acid. This new compound has a structure represented in the following formula:

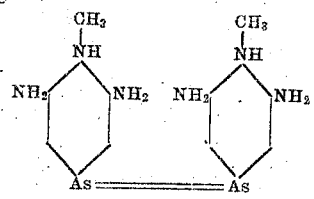

To fully disclose our invention by what we consider a method embodying the same in its preferred form we will give the following example: 7.4 parts by weight of dinitro-methylnitramino-phenyl-p-arsinic acid are suspended in 300 parts by weight of concentrated hydrochloric acid, whereupon 15.4 parts by weight of powdered tin are gradually added to the mixture, which thereby becomes heated considerably, the arsinic acid gradually going into solution. The whole is then strongly cooled, whereby a double tin salt of the formula

is thrown out. This tin salt is then separated by decantation or siphoning or otherwise, then dissolved in water and sodium hydrate solution is added in such excess that the tin oxids formed remain in solution. The new compound, which is a base, is thereby formed, separating in yellowish-green flakes and is isolated by filtering, is then thoroughly washed with water and thereupon dissolved in dilute hydrochloric acid to form a chlorid of the base, which is then thrown down by the addition of an equal volume of concentrated hydrochloric acid (spec. grav. 1-.-19). This chlorid is then separated by filtering and then washed, in succession, with alcohol and ether.

The free base, dimethyl-amino-tetramino-arseno-benzene, melts at about 95°, centigrade, with decomposition. It is insoluble in water, soluble with difficulty in alcohol, and readily soluble in acetone and acetic acid. It is light-yellowish-green in color, and soon darkens when exposed to the air. Its chlorid is obtained in the form of a yellowish-green powder which is readily soluble in water.

From an analysis of the base it was found that its composition is expressed in the empiric formula $C_{14}H_{20}N_6As_2$ and its structure in the formula above given.

What we claim and desire to secure by Letters Patent is:

1. The process of preparing a derivative of dinitro-methylnitramino-phenyl-arsinic acid which consists in treating a dinitro-methylnitramino-phenyl-arsinic acid with reducing agents.

2. The process of preparing a derivative of dinitro-methylnitramino-phenyl-arsinic acid which consists in reducing a dinitro-methylnitramino-phenyl-arsinic acid with tin and hydrochloric acid.

3. The process which consists in adding concentrated hydrochloric acid to dinitro-methylnitramino-phenyl-arsinic acid and then adding tin thereto, cooling and separating the resultant tin salt.

4. The process which consists in adding concentrated hydrochloric acid to dinitro-methylnitramino-phenyl-arsinic acid and then adding tin thereto, cooling and separating the resultant tin salt, dissolving the said tin salt in water and adding sodium hydrate solution in excess.

5. As a new chemical compound, dimethyl-amino-tetramino-arseno-benzene, having the formula:

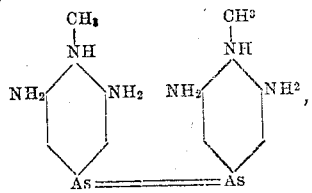

having a yellowish-green color which darkens in the air, soluble in acetone and acetic acid, soluble with difficulty in alcohol and insoluble in water, and melting with decomposition at substantially 95° centigrade.

In testimony whereof we hereunto affix our signatures in the presence of two witnesses.

LORENZ ACH.
ALBERT ROTHMANN.

Witnesses:
S. H. SHANK,
JOS. HEIFFER.